Nov. 22, 1966     W. T. SEVALD     3,287,002
HUMIDIFIERS
Filed Jan. 18, 1963     2 Sheets-Sheet 1
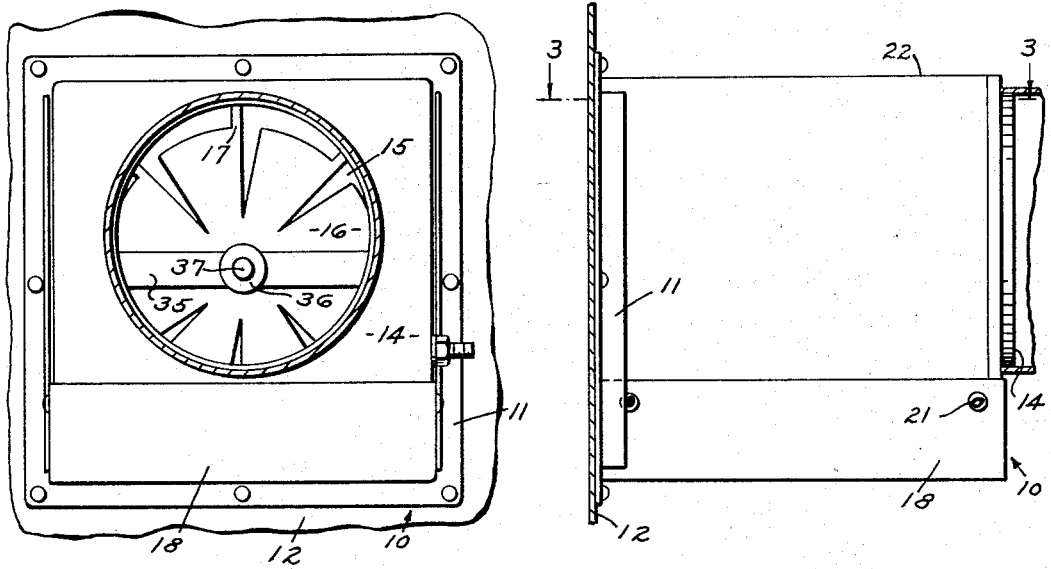
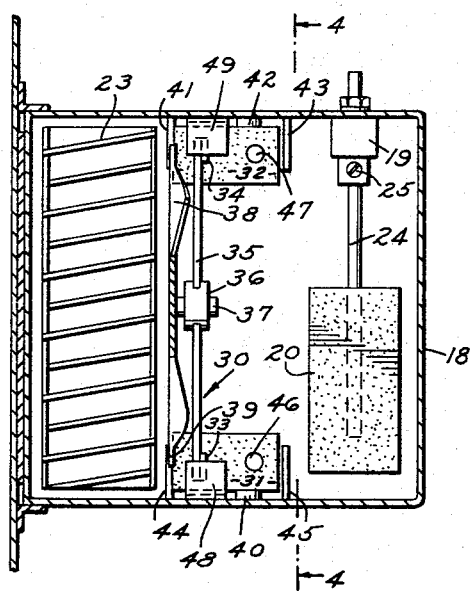
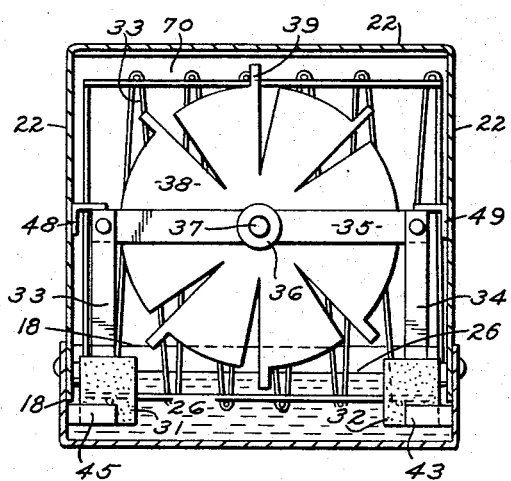
INVENTOR.
WILLIAM T. SEVALD
BY
ATTORNEY Nov. 22, 1966 W. T. SEVALD 3,287,002
HUMIDIFIERS
Filed Jan. 18, 1963 2 Sheets-Sheet 2
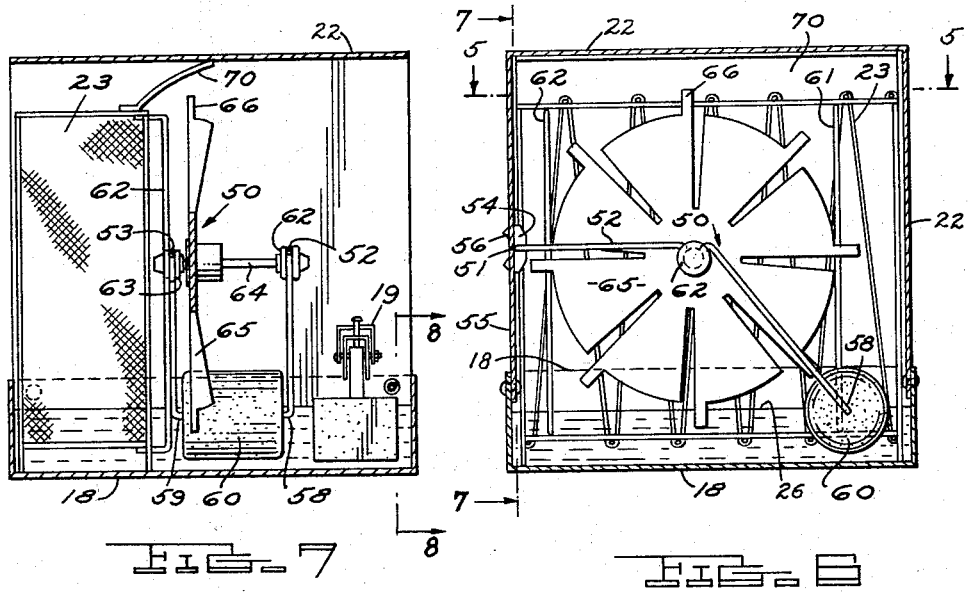
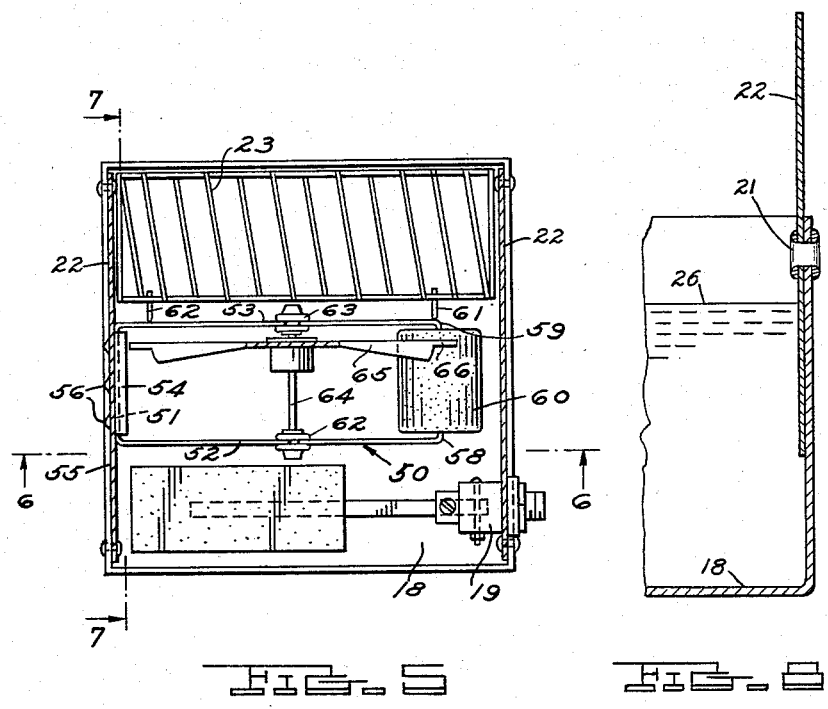
INVENTOR.
WILLIAM T. SEVALD
BY
ATTORNEY United States Patent Office 3,287,002
Patented Nov. 22, 1966

3,287,002
HUMIDIFIERS
William T. Sevald, 1400 Cedarhill Drive,
Royal Oak, Mich.
Filed Jan. 18, 1963, Ser. No. 252,386
6 Claims. (Cl. 261—92)

This application is a continuation-in-part of application Serial Number 11,267, filed February 26, 1960, now Patent Number 3,074,698.

This invention relates to humidifiers and in particular to a fan water spraying humidifier having float means automatically self-locating the fan relative to the actual water level over a wide range of water levels and to novel water pan overflow means.

The fan in this type humidifier rotationally may be driven by air travelling through the housing. The fan is equipped with tips which dip into the water in the pan as the fan rotates. The tips spray the water into air stream, on evaporator vanes, and on housing walls imparting moisture to the air travelling through.

It is important that the tips contact the water during fan rotation otherwise no humidifying spray is produced. It is also important that only the tips contact the water otherwise the water contact on the fan reduces fan speed and efficiency.

Where the fan is not automatically self positioned as in the prior art, the water level in the pan must be accurately controlled at a fixed level by water valve means to immerse the fan tips but not contact the fan blades. This has been found difficult to adjust and control in many instances. Supposedly identical valves operate sufficiently differently from one another sometimes to shut off the water before the tips are immersed and sometimes not to shut off the water until the blades are immersed.

The water valve controls the water level between a high point at which the valve shuts off and a low point at which the valve turns on. This, in conjunction with different peak water pressure, different geographical locations, and variance in water pressure during the day makes adjusting the valve very difficult and time consuming for the installing workman or homeowner.

With the foregoing in view it is an object of the invention to provide a fan which is movable up and down relative to the housing as to be automatically self-locating relative to the actual water level in the pan.

An object of the invention is to co-ordinate the fan supporting float with the fan weight to at lease partially immerse the tips and so as not to immerse the fan blades.

An object of the invention is to provide a float support for the fan which suspends the fan at various self-adjusted levels with only the tips immersed obviating the necessity of adjusting the water level relative to a fan tip fixed point.

An object of the invention is to provide fan supporting floats which at least partially support the fan and which rise and fall as the water level rises and falls moving the fan up and down with the water level.

An object of the invention is to floatingly support the fan so that the fan stays adjusted to the actual water level regardless of the water level in the humidifier pan, regardless of the shut off and turn on valve water level variations, and regardless of the difference of supply line water pressure peaks and daily pressure variations influence which changes the water level.

An object of the invention is to provide an arm supporting the fan which is pivotally supported at one end on the housing and float supported at the other end.

An object of the invention is to support the fan entirely on floats such as by floats at either end of the fan supporting arm.

An object of the invention is to provide a fan which automatically locates itself relative to the actual water level in the pan as supplied by the individual water valve in the humidifier so that thousands of humidifiers can be made and sold with the assurance that only the fan tips will be immersed in the water regardless of the particular water level supplied by the individual valve and regardless of water supply variations.

An object of the invention is to provide a water pan overflow apertures adjacent each corner of the pan so that the pan low corner aperture will allow overflow in the event of valve malfunctioning.

An object of the invention is to eyelet the shroud to the pan adjacent the four corners of the pan so that the eyelets provide the overflow openings.

An object of the invention is to provide for a wide latitude of water valve operation to insure valve operation in opening and closing.

These and other objects of the invention will become apparent by reference to the following description of a humidifier having automatic fan self-adjustment to water level and eyelet overflow openings embodying the invention taken in connection with the accompanying drawings in which:

FIG. 1 is a face elevational view of a humidifier embodying the invention shown on a furnace plenum wall which is broken away.

FIG. 2 is a side elevational view of the device seen in FIG. 1.

FIG. 3 is a cross-sectional view of the humidifier seen in FIG. 2 taken on the line 3—3 thereof.

FIG. 4 is a cross-sectional view of the humidifier shown in FIG. 3 taken on the line 4—4 thereof.

FIG. 5 is a cross-sectional view similar to FIG. 3 showing a modification.

FIG. 6 is a cross-sectional view similar to FIG. 4 further showing modification of FIG. 5.

FIG. 7 is a cross sectional view of FIGS. 5 and 6 taken on the lines 7—7 thereof; and FIG. 8 is an enlarged partial cross-sectional view of the pan, shroud and eyelet taken on the line 8—8 of FIG. 7.

Referring now to FIGS. 1 to 4 where like numerals refer to like corresponding parts throughout the several views, the humidifier having the automatic fan adjustment to water level and the eyelet overflow apertures illustrating the invention comprises a housing 10 supported by a mounting frame 11 on a frame plenum 12. A front 14 on the housing 10 has an opening 15 through which air travels from atmosphere or from a duct to the interior of the plenum 12.

As the air travels through the humidifier housing 10 it rotates a windmill fan 16 equipped with tips 17 which contact water in a pan 18 and splash water particles into the air and on an evaporator vane assembly 23 to impart moisture to the air. A water valve 19 is operated by a valve float 20 to admit water to the pan 18 and to shut off water. Eyelets 21 adjacent the four corners of the pan 18 provide water overflow openings in the event of valve 19 malfunctioning. The eyelets 21 also secure shroud 22 on the pan 18.

More particularly, the valve 19 and valve float 20 are connected by an arm 24. An adjusting screw 25 varies the relationship of the valve float 20 and arm 24 to the valve 19 providing a rough water level 26 adjustment. Any type water valve can be used to provide a rough water level in the pan 18. This water level lies below the water overflow eyelets 21 and is sufficiently deep to buoy the valve float 20. This provides for a wide range of rough water level adjustment. It has been found that various supposedly identical water valves operate at different levels under like conditions.

The fan assembly 30 includes paired floats 31 and 32, paired legs 33 and 34 fixed on the floats 31 and 32 respectively, a cross-arm 35 between the upper ends of the legs 33 and 34, a bearing 36 on the arm 35, a shaft 37 in the bearing 36, and a windmill fan 38 on the shaft 37. The fan 38 has blades equipped with tips 39.

Guides 40 and 42 may position the floats 31 and 32 at the outer sides and guides 41, 43, 44, and 45 may position the floats 31 and 32 at the ends. Counter balance weights 46 and 47 may be placed on the float to offset the fan 38 weight if necessary. Guides 48 and 49 may support the legs 33 and 34 against any tenancy of the airflow or fan weight to tip the fan 38.

The floats 31–32 support the fan 38 so that only the tips 39 contact water in the pan 18 when the floats 31 and 32 are buoyant. The water valve 19 requires a wide latitude of operation to insure opening and closing. The self adjusting fan assemblies permit this.

Thus when the installing workman or homeowner turns on the water to the valve 19, water discharges into the pan 18 and the water level rises until the valve float 20 rises and shuts off the valve 19. The adjusting screw is set so that sufficient water is in the pan to float the fan assembly 30.

Referring now to the embodiment of the novel device shown in FIGS. 5–7, the fan assembly 50 disclosed therein comprises a U-shaped fan support having paired arms 52 and 53 inter-connected by a span 51 which is pivotally mounted in a bracket 54 fixed on a housing side wall 55 by plugs or screws 56.

Extending ends 58 and 59 on the arms 52 and 53 are locked in depressions in a float 60 connecting the float 60 to the arms 52 and 53. Bearings 62 and 63 on the arms 52 and 53 rotatably support an axle 64 on which a fan 65 is mounted. The fan has blades equipped with tips 66. The float 60 supports the arms 52 and 53 and fan 65 so that only the fan tips 66 are immersed in water in the pan 18. The float controlled water valve 19 has been previously described. Guides 61 and 62 may be employed to prevent contact between the fan assembly 50 and the evaporator assembly 23.

As the water level rises and falls in the pan, the fan assemblies 30 and 50, FIGS. 3 and 5, rise and fall with the water level keeping the fan tips 39 and 66 immersed and the fan blades free of water contact for efficient speed.

It is important that the tips 39 and 66 are immersed as the fans 38 and 65 rotate. The rapid rotation of the fans tips 39 and 66 sprays water on a roof plate 70, FIG. 7, which drains the water down on the evaporator assembly 23. The tips also spray water over the housing interior walls and into the air stream travelling through the humidifier.

It can be seen that the fan assemblies 30 and 50 adjust themselves to the water level in the pan 18 as controlled by the water valve 19 to immerse the fan tips at the bottom rotation point.

The water level variations so described has been stated relative to the high and low levels as controlled by the water valve 19. However, these levels may vary widely from humidifier to humidifier and may also vary widely in various installations which have different water pressure conditions. The levels may also vary depending on the adjustment made by the installer.

In other words, the water levels in two like humidifiers may be widely different and have widely different shut off and turn on points. The novel fan assemblies adjust themselves automatically to the actual level supplied by the valve over thousands of humidifiers regardless of the pecularity of each valve.

It has been found that the valve float 20 requires an amount of water to operate which is sufficient to float the fan assemblies. This insures minimum water level to lift the fan assembly floats 31–32 and 60 off the pan 18 and render them operable to properly locate the fan with the tips in the water.

Thus the novel self-adjusting fan assemblies 30 and 50 are capable of adjusting to the actual water level in the humidifier pan. This eliminates the necessity of adjusting the water level to a fixed point so as to be properly located to the tips of a fixed fan.

The novel eyelet 21 overflow means, FIGS. 2 and 7, provides an overflow opening at the four corners of the pan 18. When mounted the humidifier pan is preferably level but it has been found in practice that one corner of the pan is lower then the others even when supposedly level. With an overflow opening at all four corners, the installer is assured of having an overflow at the low corner. Thus the novel fan assemblies 30 and 50 are capable of over-coming any difference in water level above the buoyant point of the floats 31, 32, and 60.

The overflow openings are required to insure that no water will overflow the sides of the pan 18. This insures that no water will flow into the furnace plenum.

The pan is usually porcelain enameled after the openings are formed. The pan may also be injection molded of synthetic resin. The shroud portion of the housing may be metal or synthetic resin sheet. Thus the materials may be different and unsuitable for bonding or welding. Since apertures must be formed in the pieces for attachment means, the eyelet is ideal as it not only attaches the parts together but also provides an overflow opening. This obviates extra holes and the necessity of aligning the extra holes in the shroud and pan.

Although but a single embodiment of the invention has been shown and described in detail, it is obvious that many changes may be made in the invention within the scope of the appended claims.

I claim:

1. A humidifier comprising, a water pan,
valve means for admitting a supply of water to said pan
a fan over said pan,
tips on said fan for dipping into water in said pan to spray water particles in conjunction with fan rotation, and
float means in said housing for floating on water in said pan for at least partially supporting said fan to position said fan clear of water in the pan and so as to at least partially immerse said fan tips in water in said pan;
said float means locating said fan relative to the actual water level in said pan as supplied by said valve means.

2. A humidifier comprising:
a housing including a water pan, evaporator vanes in said housing,
valve means for introducing water into said pan and for supplying water in said pan between high and low levels,
a fan in said housing over said pan,
tips on said fan for dipping into water in said pan to spray water particles on said evaporator vanes and into the air stream travelling through said housing in conjunction with fan rotation, and
float means in said housing for floating on water in said pan for at least partially supporting said fan so adapted to position said fan clear of water in the pan and so as to at least partially immerse said fan tips in said pan;
said float means raising and lowering said fan with the rise and fall of actual water level in said pan as supplied by said valve means.

3. A humidifier comprising
a housing having a bottom water pan;
said housing being adapted to have air circulated therethrough in a stream;
evaporator vanes in said housing;
a windmill fan in said housing for being driven by air circulated through said housing;
tips on said fan for contacting water in said pan and spraying water particles into the air stream and on said vanes in conjunction with fan rotation, float means in said housing for at least partially supporting said fan with only said tips contacting water in said pan, and water valve means for supplying water to said pan;

said float means being capable of raising and lowering said fan relative to the actual level of water in said pan so as to immerse only said tips at any water level as variably supplied by said valve means.

4. A humidifier comprising a housing having a bottom water pan and an open ended shroud over said pan;

said pan having a bottom wall and side walls intersecting at corners;

said pan side walls having water overflow apertures adjacent said corners;

said shroud lying over said pan having side members overlying at least one of said pan side walls;

said side members having apertures aligned with said wall apertures, eyelets clinched in the aligned apertures of said pan side walls and said shroud side members connecting said pan and shroud together;

said eyelets having an open ended hollow center providing an open channel through said pan side walls and said shroud side member apertures;

each said eyelet open channel constituting a water overflow opening for water in said pan adjacent each corner of said pan;

said housing being adapted to have air circulated therethrough;

evaporator vanes in said housing;

a fan in said housing, tips on said fan for contacting water in said pan and spraying water particles into the air and on said vanes in conjunction with fan rotation, float means in said housing for at least partially supporting said fan with only said tips contacting water in said pan, and water valve means for supplying water in said pan;

said float means being capable of raising and lowering said fan relative to the actual level of water in said pan so as to immerse only said tips at any water level as variably supplied by said valve means.

5. A humidifier housing comprising a water pan having a bottom wall and side walls intersecting at corners;

said pan side walls having water overflow apertures adjacent said corners;

a shroud lying over said pan having at least one side member at least partially overlying at least one said side wall;

said shroud side portion having apertures aligned with said pan side wall apertures; and eyelets clinched in the aligned apertures of said side walls and said shroud side portion mechanically connecting said pan and shroud together;

said eyelets having a hollow center providing an open channel through said pan side walls and said shroud side portion apertures;

each said eyelet open channel constituting a water overflow opening for water in said pan adjacent each corner of said pan.

6. A humidifier comprising a water pan having a bottom wall and side walls, said pan side walls having water overflow apertures;

a member at least partially overlying at least one said pan side wall;

said member having apertures aligned with said pan side wall apertures; and eyelets clinched in the aligned apertures of said pan side walls and member mechanically connecting said pan and member together;

said eyelets having a hollow center providing an open channel through said pan side walls and said member apertures;

each said eyelet open channel constituting a water overflow opening for water in said pan.

References Cited by the Examiner

UNITED STATES PATENTS

| | | | |
|---|---|---|---|
| 872,330 | 12/1907 | Cunningham | 261—104 |
| 1,189,600 | 7/1916 | Mallett et al. | 261—92 |
| 1,854,569 | 4/1932 | Welch | 261—92 |
| 1,962,644 | 6/1934 | Kidwell | 261—92 |
| 2,825,540 | 3/1958 | Merz et al. | 261—24 |

FOREIGN PATENTS 114,174  10/1941  Australia.

HARRY B. THORNTON, *Primary Examiner.*

RONALD R. WEAVER, *Examiner.*

E. H. RENNER, *Assistant Examiner.*